United States Patent
Ohmori et al.

(10) Patent No.: US 11,316,177 B2
(45) Date of Patent: Apr. 26, 2022

(54) FUEL CELL JOINT SEPARATOR AND FUEL CELL

(71) Applicant: HONDA MOTOR CO., LTD., Tokyo (JP)

(72) Inventors: Suguru Ohmori, Wako (JP); Takuro Okubo, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 16/794,269

(22) Filed: Feb. 19, 2020

(65) Prior Publication Data

US 2020/0274174 A1   Aug. 27, 2020

(30) Foreign Application Priority Data

Feb. 22, 2019   (JP) .............................. JP2019-030757

(51) Int. Cl.
| | | |
|---|---|---|
| *H01M 8/0267* | (2016.01) | |
| *H01M 8/0206* | (2016.01) | |
| *H01M 8/0273* | (2016.01) | |
| *H01M 8/2483* | (2016.01) | |
| *H01M 8/1004* | (2016.01) | |
| *H01M 8/248* | (2016.01) | |
| *H01M 8/0263* | (2016.01) | |
| *H01M 8/0247* | (2016.01) | |
| *H01M 8/0297* | (2016.01) | |

(52) U.S. Cl.
CPC ....... *H01M 8/0267* (2013.01); *H01M 8/0206* (2013.01); *H01M 8/0247* (2013.01); *H01M 8/0263* (2013.01); *H01M 8/0273* (2013.01); *H01M 8/0297* (2013.01); *H01M 8/1004* (2013.01); *H01M 8/248* (2013.01); *H01M 8/2483* (2016.02); *H01M 2250/20* (2013.01)

(58) Field of Classification Search
CPC ............. H01M 8/0267; H01M 8/2483; H01M 8/0206; H01M 8/0247; H01M 8/0263; H01M 8/023; H01M 8/0297; H01M 8/1004; H01M 8/248
See application file for complete search history.

(56) References Cited

U.S. PATENT DOCUMENTS

| | | | |
|---|---|---|---|
| 8,371,587 B2 | 2/2013 | Fly et al. | |
| 2006/0061045 A1* | 3/2006 | Burg | F16J 15/0818 277/593 |
| 2018/0287181 A1* | 10/2018 | Rock | H01M 8/0247 |

* cited by examiner

*Primary Examiner* — Helen Oi K Conley
(74) *Attorney, Agent, or Firm* — Amin, Turocy & Watson, LLP

(57) ABSTRACT

A fuel cell joint separator includes a passage bead and an outer bead. In a dual seal section where the passage bead and the outer bead extend next to each other, a ridge protruding from one surface of a metal separator is formed integrally with the metal separator, between the passage bead and the outer bead. The height of the ridge is smaller than the height of the bead seal compressed by the tightening load. A joining line is provided between the outer bead and the ridge.

7 Claims, 7 Drawing Sheets

FIG. 2

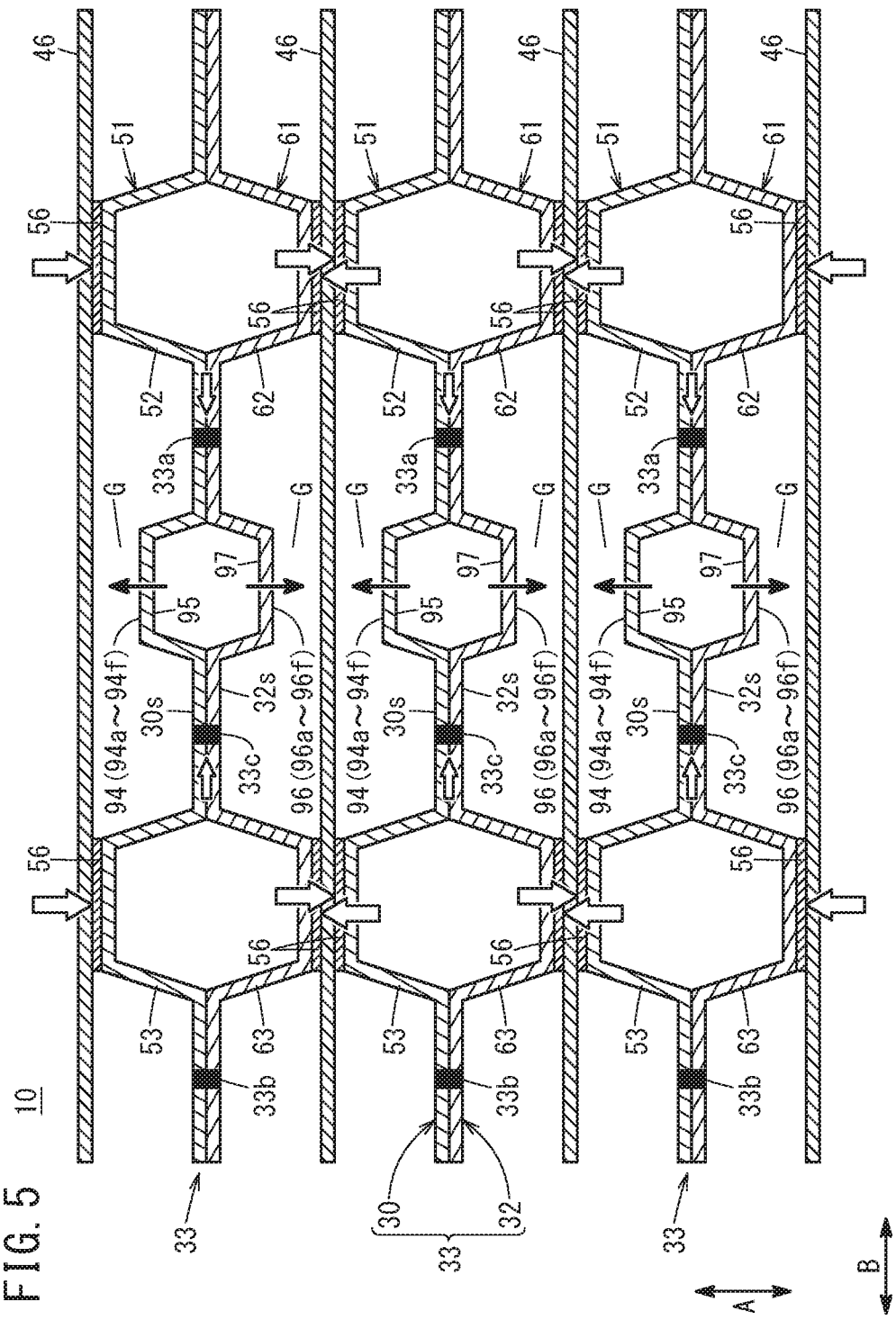

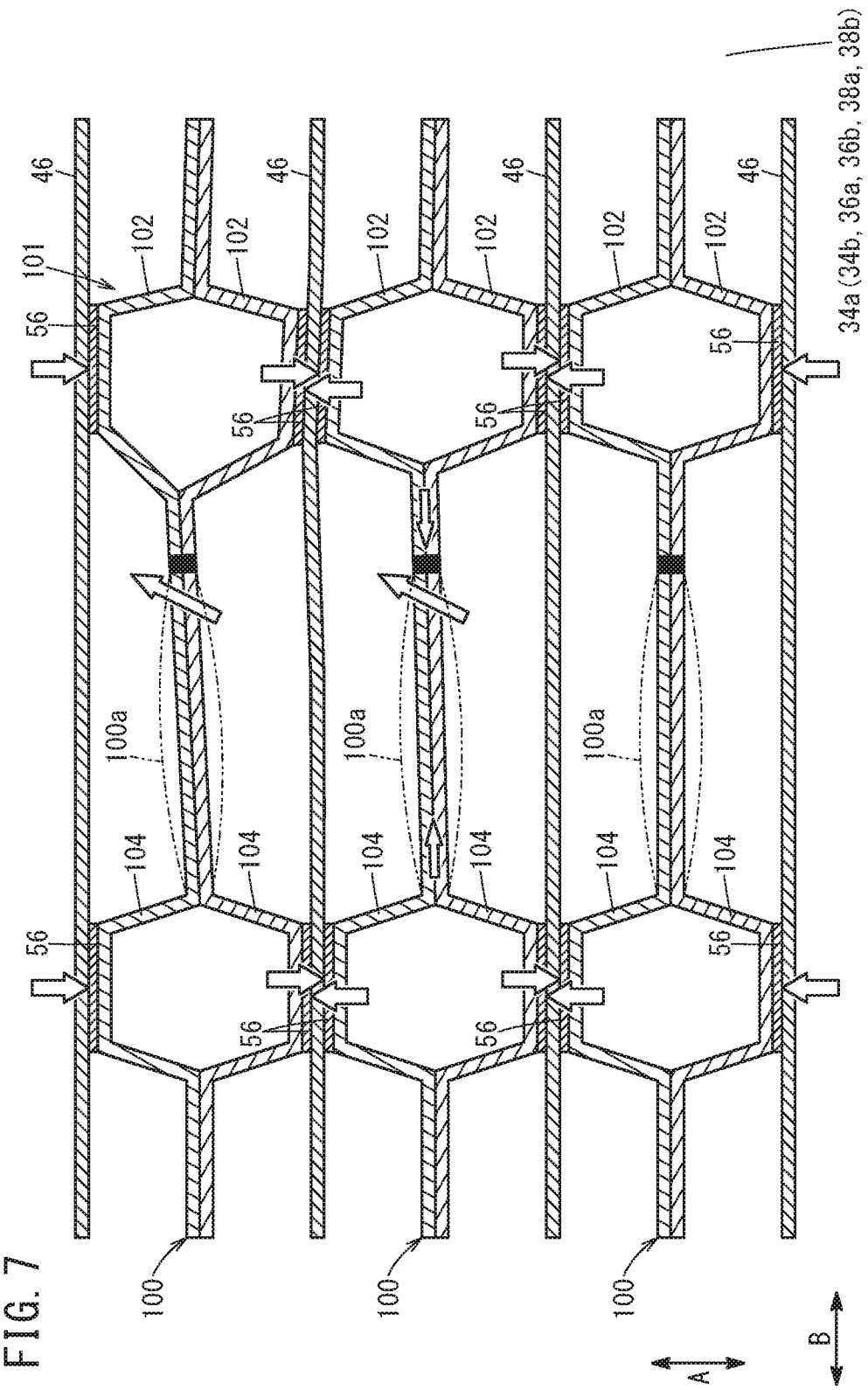

FUEL CELL JOINT SEPARATOR AND FUEL CELL

CROSS-REFERENCE TO RELATED APPLICATION

This application is based upon and claims the benefit of priority from Japanese Patent Application No. 2019-030757 filed on Feb. 22, 2019, the contents of which are incorporated herein by reference.

BACKGROUND OF THE INVENTION

Field of the Invention

The present invention relates to a fuel cell joint separator and a fuel cell.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) including an anode provided on one surface of a solid polymer electrolyte membrane, and a cathode provided on the other surface of the solid polymer electrolyte membrane, respectively. The membrane electrode assembly is sandwiched between separators (bipolar plates) to form a power generation cell (unit fuel cell). In use, a predetermined number of power generation cells are stacked together to form, e.g., an in-vehicle fuel cell stack.

In each of the power generation cells, a fuel gas flow field as one of reactant gas flow fields is formed between the MEA and one of separators, and an oxygen-containing gas flow field as the other of the reactant gas flow fields is formed between the MEA and the other of the separators. Further, a plurality of reactant gas passages extend through the power generation cell in the stacking direction.

In some cases, in the power generation cell, as the separators, metal separators are used. For example, according to the disclosure of the specification of U.S. Pat. No. 8,371,587, as a seal, a ridge shaped bead seal is formed on a metal separator by press forming. The bead seal includes a passage bead provided around a reactant gas passage, etc., and an outer bead provided around the passage bead and the reactant gas flow field.

SUMMARY OF THE INVENTION

The present invention has been made in relation to the above conventional technique, and an object of the present invention is to provide a fuel cell joint separator and a fuel cell which make it possible to apply a uniform compression load to a bead seal.

According to a first aspect of the present invention, a fuel cell joint separator is provided. The fuel cell joint separator is formed by joining two metal separators together, a reactant gas flow field being formed on one surface as a reaction surface of each of the two metal separators, the reactant gas flow field being configured to allow a fuel gas or an oxygen-containing gas as a reactant gas to flow through the reactant gas flow field, a fluid passage connected to the reactant gas flow field or a coolant flow field penetrating through the fuel cell joint separator in a separator thickness direction, a bead seal protruding from the one surface of the metal separator, the bead seal being configured to prevent leakage of the reactant gas or a coolant as fluid, the bead seal including a passage bead provided around the fluid passage and an outer bead provided around the reactant gas flow field, the fuel cell joint separator being stacked on a membrane electrode assembly, a tightening load in a stacking direction being applied to the fuel cell joint separator, wherein in a dual seal section where the passage bead and the outer bead extend next to each other, a ridge protruding from the one surface is formed integrally with the metal separator, between the passage bead and the outer bead, a height of the ridge is smaller than a height of the bead seal compressed by the tightening load, and a joining line configured to join the two metal separators together, is provided between the outer bead and the ridge.

According a second aspect of the present invention, a fuel cell joint separator is provided. The fuel cell joint separator is formed by joining two metal separators together, a reactant gas flow field being formed on one surface as a reaction surface of each of the two metal separators, the reactant gas flow field being configured to allow a fuel gas or an oxygen-containing gas as a reactant gas to flow through the reactant gas flow field, a fluid passage connected to the reactant gas flow field or a coolant flow field penetrating through the fuel cell joint separator in a separator thickness direction, a bead seal protruding from the one surface of the metal separator, the bead seal being configured to prevent leakage of the reactant gas or a coolant as fluid, the bead seal including a passage bead provided around the fluid passage and an outer bead provided around the reactant gas flow field, the fuel cell joint separator being stacked on a membrane electrode assembly, a tightening load in a stacking direction being applied to the fuel cell joint separator, wherein a plurality of joining lines configured to join the two metal separators together, are provided in parallel between the passage bead and the outer bead.

According to a third aspect of the present invention, a fuel cell is provided. The fuel cell includes a membrane electrode assembly, and a fuel cell joint separator stacked on the membrane electrode assembly, wherein the fuel cell joint separator is formed by joining two metal separators together, a reactant gas flow field is formed on one surface as a reaction surface of each of the two metal separators, the reactant gas flow field being configured to allow a fuel gas or an oxygen-containing gas as a reactant gas to flow through the reactant gas flow field, a fluid passage connected to the reactant gas flow field or a coolant flow field penetrates through the fuel cell joint separator in a separator thickness direction, a bead seal protrudes from the one surface of the metal separator, the bead seal being configured to prevent leakage of the reactant gas or a coolant as fluid, the bead seal includes a passage bead provided around the fluid passage and an outer bead provided around the reactant gas flow field, and the fuel cell joint separator is stacked on the membrane electrode assembly, a tightening load in a stacking direction being applied to the fuel cell joint separator, and wherein in a dual seal section where the passage bead and the outer bead extend next to each other, a ridge protruding from the one surface is formed integrally with the metal separator, between the passage bead and the outer bead, a height of the ridge is smaller than a height of the bead seal compressed by the tightening load, and a joining line configured to join the two metal separators together, is provided between the outer bead and the ridge.

In the present invention, the ridge provided between the passage bead and the outer bead absorbs movement of a root of the bead seal to be displaced in a plane direction. Therefore, at the time of applying the tightening load, generation of rotational moment of the bead seal is suppressed. Further, by the joining line provided between the outer bead and the ridge, it is possible to eliminate or reduce the situations where the metal separators are spaced from each other between the outer bead and the ridge, and it is possible to suppress generation of the rotational moment more effectively. Accordingly, it becomes possible to apply the uniform compression load (seal pressure) to the bead seal, and obtain the desired sealing performance.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is an exploded perspective view showing a power generation cell;

FIG. 5 is a cross sectional view showing a fuel cell stack at a position corresponding to a line V-V in FIG. 3;

FIG. 7 is a cross sectional view showing a fuel cell stack including a metal separator according to a comparative example.

DESCRIPTION OF THE PREFERRED EMBODIMENTS

Figure 1:
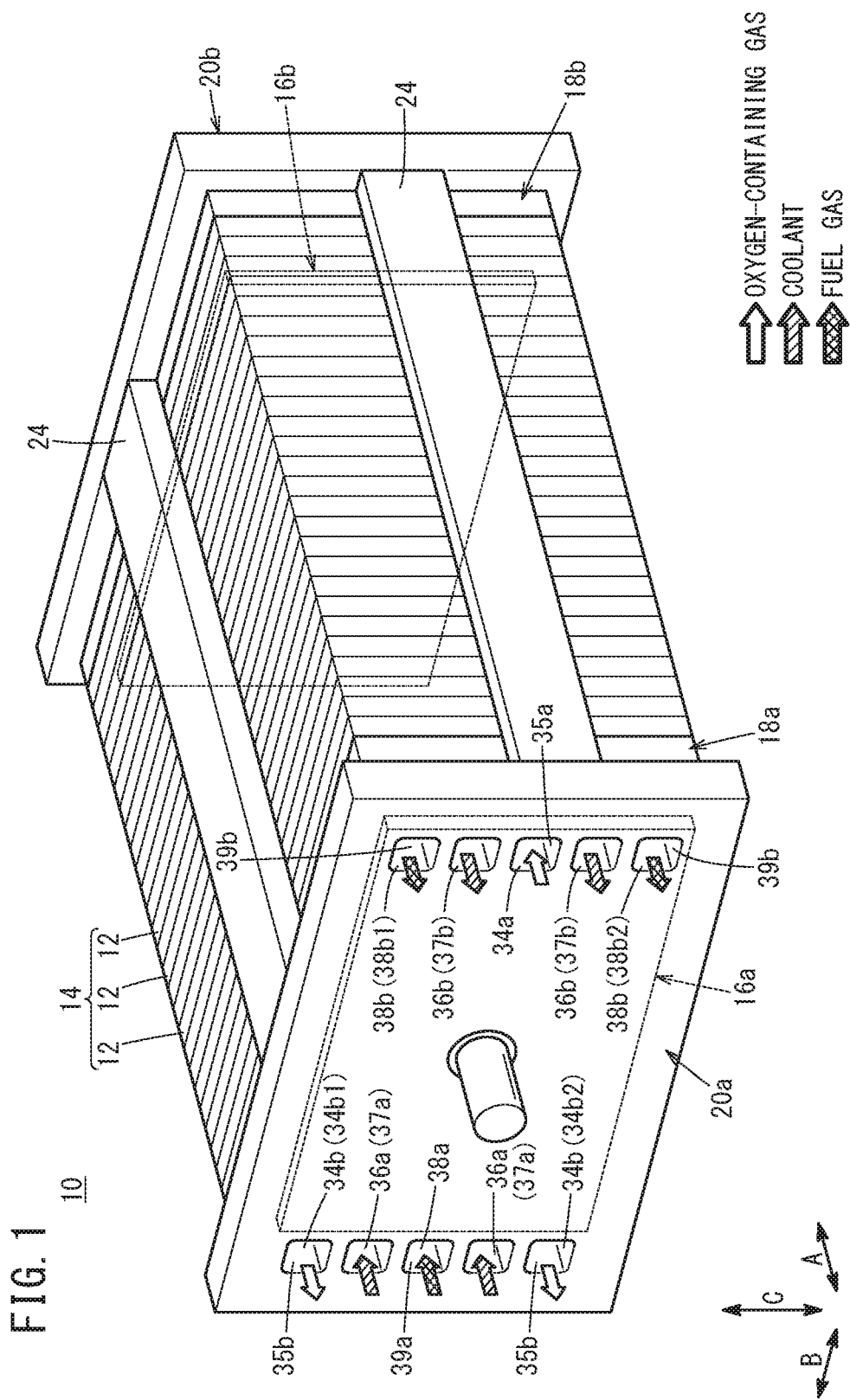
FIG. 1 is a perspective view showing a fuel cell stack according to an embodiment of the present invention.

As shown in FIG. 1, a fuel cell stack 10 according to an embodiment of the present invention includes a stack body 14 formed by stacking a plurality of power generation cells 12 together in a horizontal direction indicated by an arrow A or in the gravity direction indicated by an arrow C. For example, the fuel cell stack 10 is mounted in a fuel cell vehicle such as a fuel cell electric automobile (not shown).

At one end of the stack body 14 in the stacking direction indicated by the arrow A, a terminal plate (power collection plate) 16a is disposed. An insulator 18a is disposed outside the terminal plate 16a, and an end plate 20a is disposed outside the insulator 18a. At the other end of the stack body 14 in the stacking direction, a terminal plate 16b is disposed. An insulator 18b is disposed outside the terminal plate 16b, and an end plate 20b is disposed outside the insulator 18b. The insulator 18a (one of the insulators 18a, 18b) is disposed between the stack body 14 and the end plate 20a (one of the end plates 20a, 20b). The insulator 18b (the other of the insulators 18a, 18b) is disposed between the stack body 14 and the end plate 20b (the other of the end plates 20a, 20b). For example, each of the insulators 18a, 18b is made of polycarbonate (PC) or phenol resin.

Each of the end plates 20a, 20b has a laterally elongated (or a longitudinally elongated) rectangular shape, and coupling bars 24 are disposed between the sides of the end plates 20a, 20b. Both ends of each of the coupling bars 24 are fixed to inner surfaces of the end plates 20a, 20b, for applying a tightening load in the stacking direction (indicated by the arrow A) to the plurality of power generation cells 12 that are stacked together. It should be noted that the fuel cell stack 10 may include a casing including the end plates 20a, 20b, and the stack body 14 may be placed in the casing.

Figure 2:
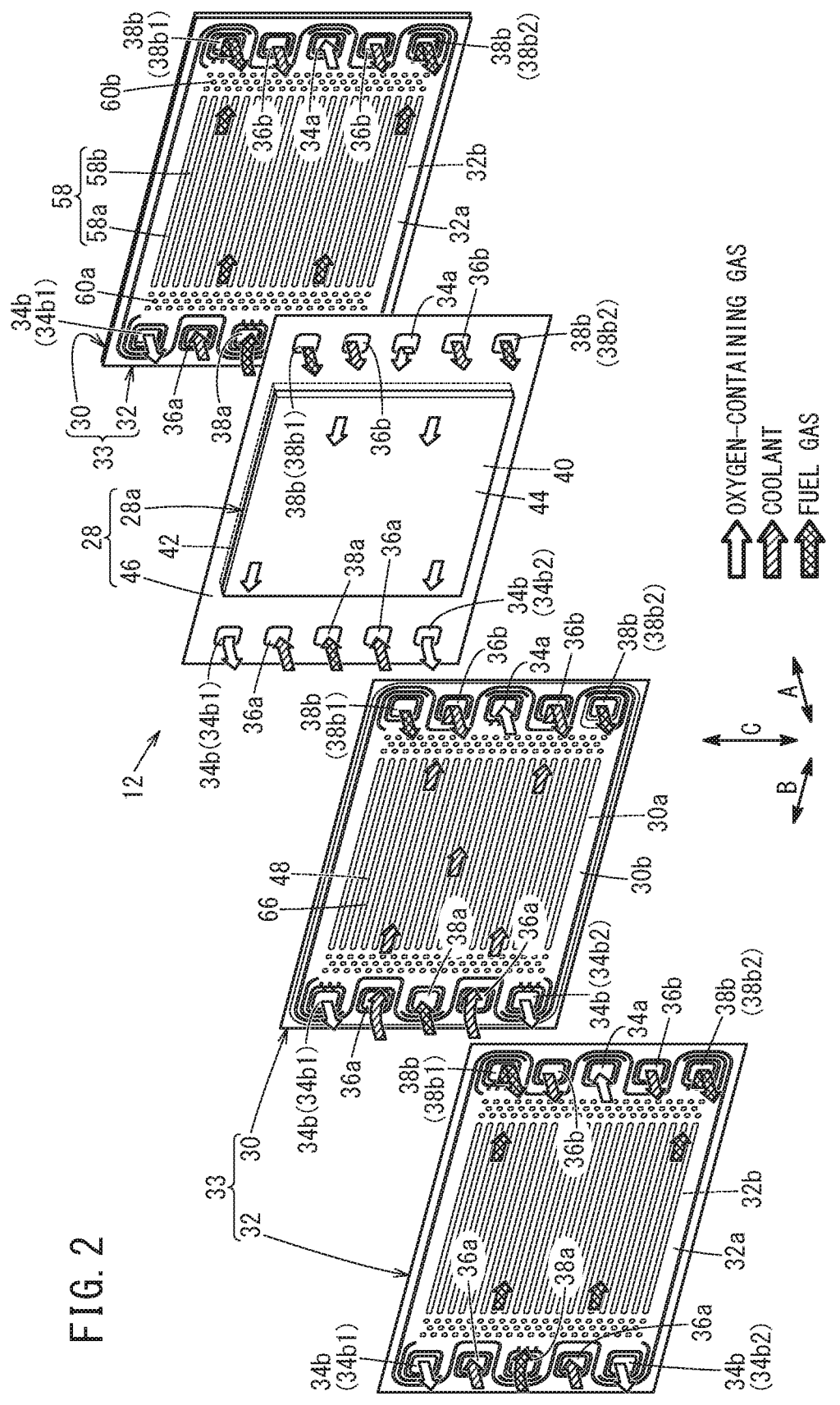

As shown in FIG. 2, the power generation cell 12 includes a resin frame equipped MEA 28, and a first metal separator 30 and a second metal separator 32 sandwiching the resin frame equipped MEA 28. For example, each of the first metal separator 30 and the second metal separator 32 is formed by press forming of steel plates, stainless steel plates, aluminum plates, plated steel plates, or metal thin plates having an anti-corrosive surface by surface treatment to have a corrugated shape in cross section.

The resin frame equipped MEA 28 includes a membrane electrode assembly 28a (hereinafter referred to as the "MEA 28a"), and a resin frame member 46 joined to an outer peripheral portion of the MEA 28a and provided around the outer peripheral portion. The MEA 28a includes an electrolyte membrane 40, an anode (first electrode) 42 provided on one surface of the electrolyte membrane 40, and a cathode (second electrode) 44 provided on the other surface of the electrolyte membrane 40.

For example, the electrolyte membrane 40 is a solid polymer electrolyte membrane (cation ion exchange membrane). For example, the solid polymer electrolyte membrane is a thin membrane of perfluorosulfonic acid containing water. The electrolyte membrane 40 is held between the anode 42 and the cathode 44. A fluorine based electrolyte may be used as the electrolyte membrane 40. Alternatively, an HC (hydrocarbon) based electrolyte may be used as the electrolyte membrane 40.

Though not shown in detail, the anode 42 includes a first electrode catalyst layer joined to one surface of the electrolyte membrane 40, and a first gas diffusion layer stacked on the first electrode catalyst layer. The cathode 44 includes a second electrode catalyst layer joined to the other surface of the electrolyte membrane 40, and a second gas diffusion layer stacked on the second electrode catalyst layer.

At one end of the power generation cell 12 (in a long side direction indicated by an arrow B (horizontal direction in FIG. 2), an oxygen-containing gas supply passage 34a, a plurality of coolant discharge passages 36b, and a plurality of (e.g., two as in the case of this embodiment) fuel gas discharge passages 38b (reactant gas discharge passages) are provided. The oxygen-containing gas supply passage 34a, the coolant discharge passages 36b, and the fuel gas discharge passages 38b penetrate through the power generation cell 12 in the stacking direction. The oxygen-containing gas supply passage 34a, the coolant discharge passages 36b, and the fuel gas discharge passages 38b penetrate through the stack body 14, the insulator 18a and the end plate 20a in the stacking direction (the oxygen-containing gas supply passage 34a, the coolant discharge passages 36b, and the fuel gas discharge passages 38b may penetrate through the terminal plate 16a). These fluid passages are arranged in the upper/lower direction (in a direction along the short side of the rectangular power generation cell 12). A fuel gas (one of reactant gases) such as a hydrogen-containing gas is discharged through the fuel gas discharge passages 38b. An oxygen-containing gas (the other of reactant gases) is supplied through the oxygen-containing gas supply passage 34a. The coolant is discharged through the coolant discharge passages 36b.

The oxygen-containing gas supply passage 34a is positioned between the two coolant discharge passages 36b that are positioned separately at upper and lower positions. The plurality of fuel gas discharge passages 38b includes an upper fuel gas discharge passage 38b1 and a lower fuel gas discharge passage 38b2. The upper fuel gas discharge passage 38b1 is positioned above the upper coolant discharge passage 36b. The lower fuel gas discharge passage 38b2 is positioned below the lower coolant discharge passage 36b.

At the other end of the power generation cell 12 in the direction indicated by the arrow B, a fuel gas supply passage 38a, a plurality of coolant supply passages 36a, and a plurality of (e.g., two as in the case of this embodiment) oxygen-containing gas discharge passages 34b (reactant gas discharge passages) are provided. The fuel gas supply passage 38a, the coolant supply passages 36a, and the oxygen-containing gas discharge passages 34b penetrate through the power generation cell 12 in the stacking direction. The fuel gas supply passage 38a, the coolant supply passages 36a, and the oxygen-containing gas discharge passages 34b penetrate through the stack body 14, the insulator 18a, and the end plate 20a in the stacking direction (the fuel gas supply passage 38a, the coolant supply passages 36a, and the oxygen-containing gas discharge passages 34b may penetrate through the terminal plate 16a). These fluid passages are arranged in the upper/lower direction (in a direction along the short side of the rectangular power generation cell 12).

The fuel gas is supplied through the fuel gas supply passage 38a. The coolant is supplied through the coolant supply passages 36a. The oxygen-containing gas is discharged through the oxygen-containing gas discharge passages 34b. The layout of the oxygen-containing gas supply passage 34a, the oxygen-containing gas discharge passages 34b, the fuel gas supply passage 38a, and the fuel gas discharge passages 38b are not limited to the illustrated embodiment, and may be determined as necessary depending on the required specification.

The fuel gas supply passage 38a is positioned between the two coolant supply passages 36a that are positioned separately at upper and lower positions. The plurality of oxygen-containing gas discharge passages 34b includes an upper oxygen-containing gas discharge passage 34b1 and a lower oxygen-containing gas discharge passage 34b2. The upper oxygen-containing gas discharge passage 34b1 is positioned above the upper coolant supply passage 36a, and the lower oxygen-containing gas discharge passage 34b2 is positioned below the lower coolant supply passage 36a.

As shown in FIG. 1, the oxygen-containing gas supply passage 34a, the coolant supply passages 36a, and the fuel gas supply passage 38a are connected to inlets 35a, 37a, 39a provided in the end plate 20a. Further, the oxygen-containing gas discharge passages 34b, the coolant discharge passages 36b, and the fuel gas discharge passages 38b are connected to outlets 35b, 37b, 39b provided in the end plate 20a.

As shown in FIG. 2, at one end of the resin frame member 46 in the direction indicated by the arrow B, the oxygen-containing gas supply passage 34a, the plurality of coolant discharge passages 36b, and the plurality of fuel gas discharge passages 38b are provided. At the other end of the resin frame member 46 in the direction indicated by the arrow B, the fuel gas supply passage 38a, the plurality of coolant supply passages 36a, and the plurality of oxygen-containing gas discharge passages 34b are provided.

The electrolyte membrane 40 may protrude outward without using the resin frame member 46. Alternatively, frame shaped films may be provided on both sides of the electrolyte membrane 40 which protrudes outward.

Figure 3:
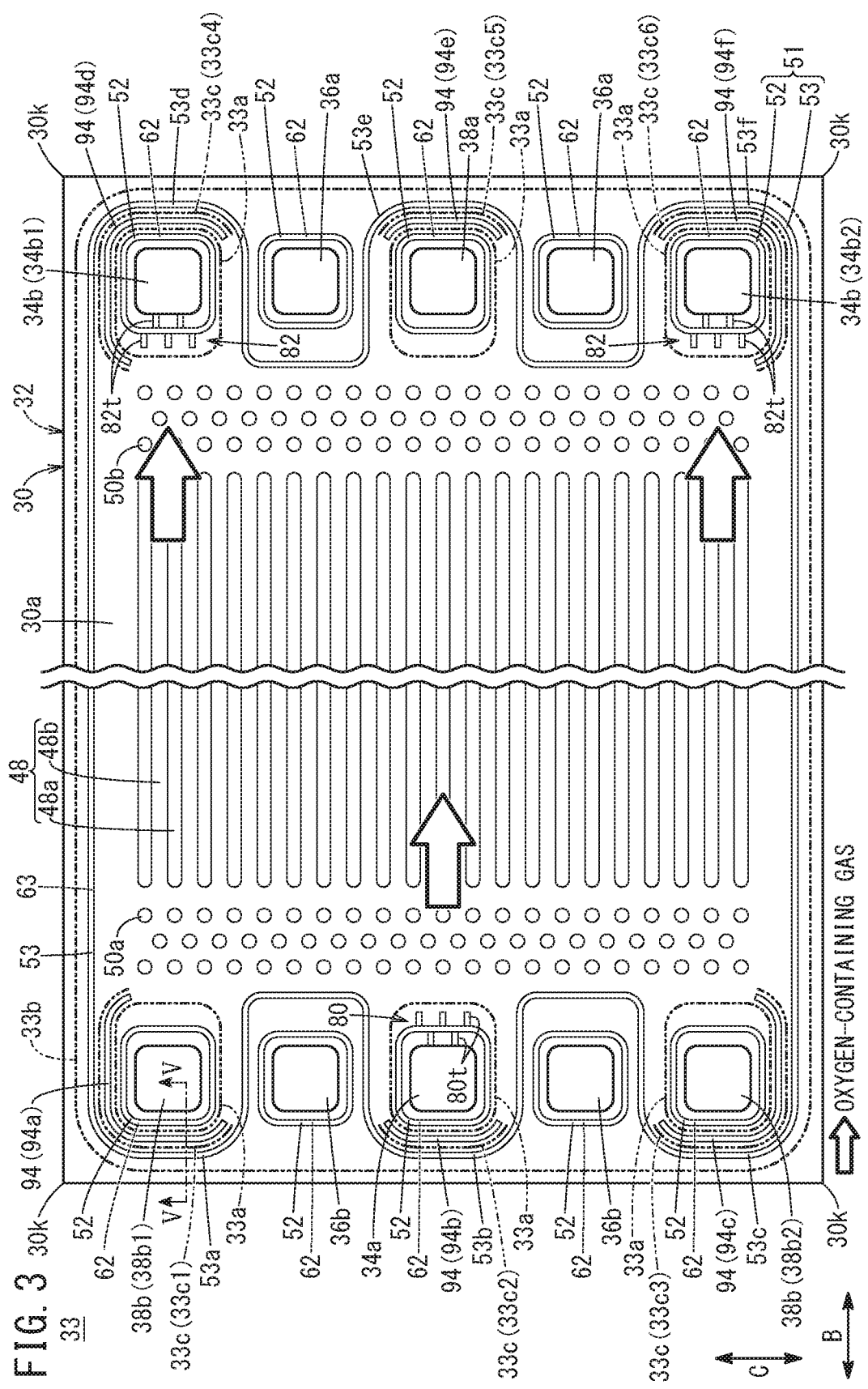
FIG. 3 is a view showing structure of a joint structure viewed from a side where a first metal separator is present.

As shown in FIG. 3, the first metal separator 30 has an oxygen-containing gas flow field 48 on its surface 30a facing the resin frame equipped MEA 28. For example, the oxygen-containing gas flow field 48 extends in the direction indicated by the arrow B. The oxygen-containing gas flow field 48 is connected to (in fluid communication with) the oxygen-containing gas supply passage 34a and the oxygen-containing gas discharge passages 34b. The oxygen-containing gas flow field 48 includes straight flow grooves (or wavy flow grooves) 48b between a plurality of ridges 48a extending in the direction indicated by the arrow B.

An inlet buffer 50a having a plurality of bosses is provided between the oxygen-containing gas supply passage 34a and the oxygen-containing gas flow field 48 by press forming. An outlet buffer 50b having a plurality of bosses is provided between the oxygen-containing gas discharge passages 34b and the oxygen-containing gas flow field 48 by press forming.

A bead seal 51 is formed on the surface 30a of the first metal separator 30 by press forming. The bead seal 51 protrudes toward the resin frame equipped MEA 28. The bead seal 51 tightly contacts the resin frame member 46, and is deformed elastically by the tightening force in the stacking direction to provide seal structure for sealing a position between the bead seal 51 and the resin frame member 46 in an air tight and liquid tight manner. The bead seal 51 includes a plurality of passage beads 52 and an outer bead 53.

The plurality of passage beads 52 are provided around the oxygen-containing gas supply passage 34a, the oxygen-containing gas discharge passages 34b, the fuel gas supply passage 38a, the fuel gas discharge passages 38b, the coolant supply passages 36a, and the coolant discharge passages 36b, respectively. A bridge section 80 is provided in the passage bead 52 around the oxygen-containing gas supply passage 34a. The bridge section 80 has a plurality of tunnels 80t connecting the oxygen-containing gas supply passage 34a and the oxygen-containing gas flow field 48. A bridge section 82 is provided in each of the passage beads 52 around the oxygen-containing gas discharge passages 34b. The bridge section 82 has a plurality of tunnels 82t connecting the oxygen-containing gas discharge passages 34b and the oxygen-containing gas flow field 48.

The outer bead 53 is provided along the outer peripheral portion of the first metal separator 30, and provided around the oxygen-containing gas flow field 48, the oxygen-containing gas supply passage 34a, the two oxygen-containing gas discharge passages 34b, the fuel gas supply passage 38a, and the two fuel gas discharge passages 38b.

At one end of the first metal separator 30 in the longitudinal direction, the outer bead 53 extends in a serpentine pattern between the upper fuel gas discharge passage 38b1 and the upper coolant discharge passage 36b, between the upper coolant discharge passage 36b and the oxygen-containing gas supply passage 34a, between the oxygen-containing gas supply passage 34a and the lower coolant discharge passage 36b, and between the lower coolant discharge passage 36b and the lower fuel gas discharge passage 38b2. Therefore, at one end of the first metal separator 30 in the longitudinal direction, the outer bead 53 includes three expanded portions 53a, 53b, 53c expanded toward one of the short sides of the first metal separator 30, and provided partially around the upper fuel gas discharge passage 38b1, the oxygen-containing gas supply passage 34a, and the lower fuel gas discharge passage 38b2, respectively.

At the other end of the first metal separator 30 in the longitudinal direction, the outer bead 53 extends in a serpentine pattern between the upper oxygen-containing gas discharge passage 34b1 and the upper coolant supply passage 36a, between the upper coolant supply passage 36a and the fuel gas supply passage 38a, between the fuel gas supply passage 38a and the lower coolant supply passage 36a, and between the lower coolant supply passage 36a and the lower oxygen-containing gas discharge passage 34b2. Therefore, at the other end of the first metal separator 30 in the longitudinal direction, the outer bead 53 includes three expanded portions 53d, 53e, 53f expanded toward the other of the short sides of the first metal separator 30, and provided partially around the upper oxygen-containing gas discharge passage 34b1, the fuel gas supply passage 38a, and the lower oxygen-containing gas discharge passage 34b2.

Figure 4:
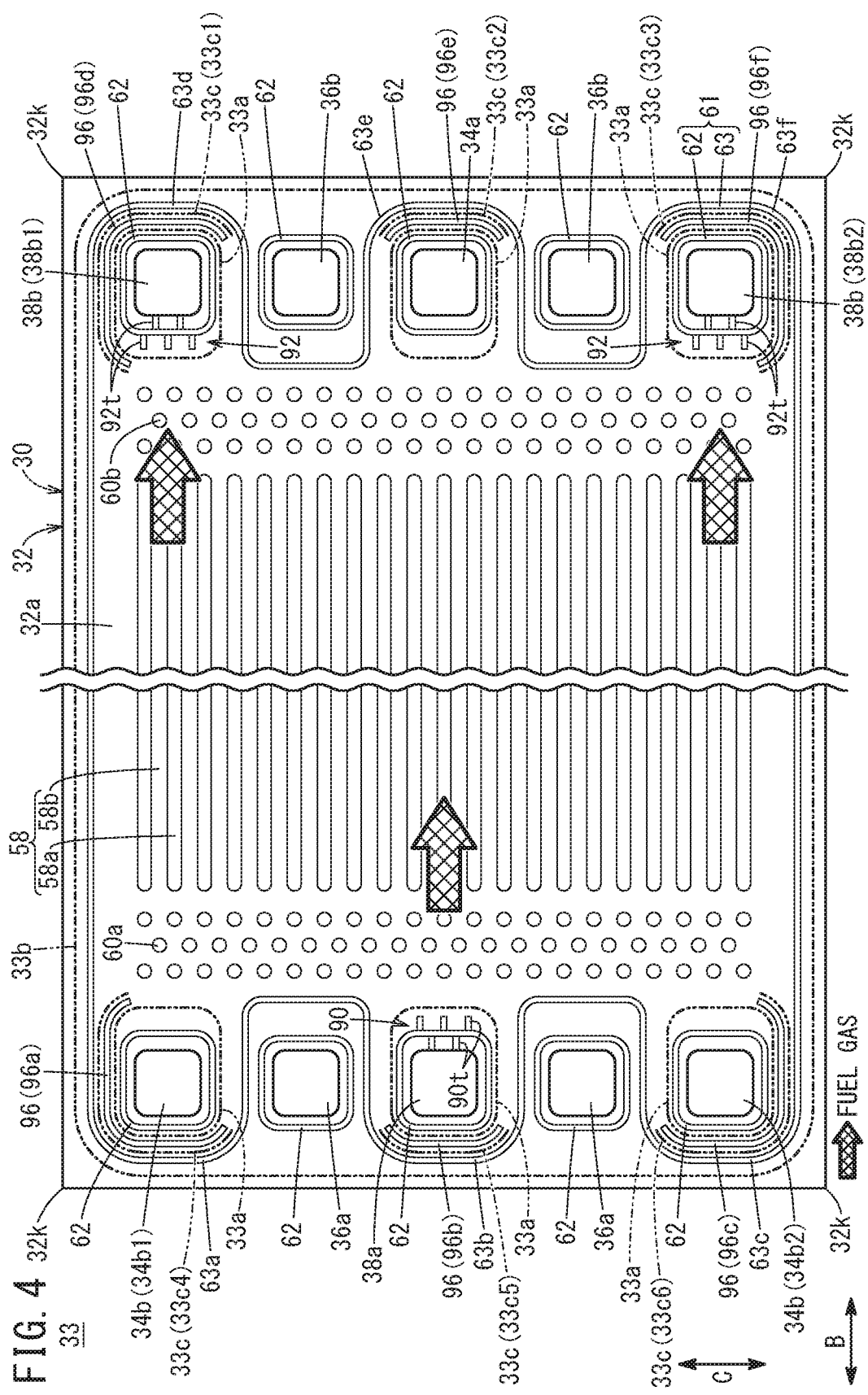
FIG. 4 is a view showing structure of the joint separator viewed from a side where a second metal separator is present.

As shown in FIG. 4, the second metal separator 32 has a fuel gas flow field 58 on its surface 32a facing the resin frame equipped MEA 28. For example, the fuel gas flow field 58 extends in the direction indicated by the arrow B. The fuel gas flow field 58 is connected to (in fluid communication with) the fuel gas supply passage 38a and the fuel gas discharge passages 38b. The fuel gas flow field 58 includes straight flow grooves (or wavy flow grooves) 58b between a plurality of ridges 58a extending in the direction indicated by the arrow B.

An inlet buffer 60a having a plurality of bosses are provided by press forming between the fuel gas supply passage 38a and the fuel gas flow field 58. An outlet buffer 60b having a plurality of bosses are provided by press forming between the fuel gas discharge passages 38b and the fuel gas flow field 58.

A bead seal 61 is formed on the surface 32a of the second metal separator 32 by press forming. The bead seal 61 protrudes toward the resin frame equipped MEA 28. The bead seal 61 tightly contacts the resin frame member 46, and is deformed elastically by the tightening force in the stacking direction to provide seal structure for sealing a position between the bead seal 61 and the resin frame member 46 in an air tight and liquid tight manner. The bead seal 61 includes a plurality of passage beads 62 and an outer bead 63.

The plurality of the passage beads 62 are provided around the oxygen-containing gas supply passage 34a, the oxygen-containing gas discharge passages 34b, the fuel gas supply passage 38a, the fuel gas discharge passages 38b, the coolant supply passages 36a, and the coolant discharge passages 36b, respectively. A bridge section 90 having a plurality of tunnels 90t is formed in the passage bead 62 around the fuel gas supply passage 38a. The tunnels 90t connect the fuel gas supply passage 38a and the fuel gas flow field 58. A bridge section 92 having a plurality of tunnels 92t is formed in each of the passage beads 62 around the fuel gas discharge passages 38b. The tunnels 92t connect the fuel gas discharge passages 38b and the fuel gas flow field 58.

The outer bead 63 is provided along the outer peripheral portion of the second metal separator 32, and provided around the fuel gas flow field 58, the oxygen-containing gas supply passage 34a, the oxygen-containing gas discharge passages 34b, the fuel gas supply passage 38a, and the fuel gas discharge passages 38b.

At one end of the second metal separator 32 in the longitudinal direction, the outer bead 63 extends in a serpentine pattern between the upper oxygen-containing gas discharge passage 34b1 and the upper coolant supply passage 36a, between the upper coolant supply passage 36a and the fuel gas supply passage 38a, between the fuel gas supply passage 38a and the lower coolant supply passage 36a, and between the lower coolant supply passage 36a and the lower oxygen-containing gas discharge passage 34b2. Therefore, at one end of the second metal separator 32 in the longitudinal direction, the outer bead 63 includes three expanded portions 63a, 63b, 63c expanded toward one of the short sides of the second metal separator 32, and provided partially around the upper oxygen-containing gas discharge passage 34b1, the fuel gas supply passage 38a, and the lower oxygen-containing gas discharge passage 34b2.

At the other end of the second metal separator 32 in the longitudinal direction, the outer bead 63 extends in a serpentine pattern between the upper fuel gas discharge passage 38b1 and the upper coolant discharge passage 36b, between the upper coolant discharge passage 36b and the oxygen-containing gas supply passage 34a, between the oxygen-containing gas supply passage 34a and the lower coolant discharge passage 36b, and between the lower coolant discharge passage 36b and the lower fuel gas discharge passage 38b2. Therefore, at the other end of the second metal separator 32, the outer bead 63 includes three expanded portions 63d, 63e, 63f expanded toward the other of the short sides of the second metal separator 32, and provided partially around the upper fuel gas discharge passage 38b1, the oxygen-containing gas supply passage 34a, and the lower fuel gas discharge passage 38b2.

In FIG. 2, outer ends of the first metal separator 30 and the second metal separator 32 are joined together by welding, brazing, etc., to form a joint separator 33. A coolant flow field 66 is formed between a back surface 30b of the first metal separator 30 and a back surface 32b of the second metal separator 32 that are joined together. The coolant flow field 66 is connected to (in fluid communication with) the coolant supply passage 36a and the coolant discharge passages 36b. When the first metal separator 30 and the second metal separator 32 are stacked together, the coolant flow field 66 is formed between the back surface of the oxygen-containing gas flow field 48 and the back surface of the fuel gas flow field 58.

In FIG. 3, the first metal separator 30 and the second metal separator 32 of the joint separator 33 are joined together by joining lines 33a, 33b, 33c (for convenience of illustration, the joining lines 33a, 33b, 33c are denoted by virtual lines). For example, the joining lines 33a, 33b, 33c are laser welding lines. The joining lines 33a, 33b, 33c may be joining sections where the first metal separator 30 and the second metal separator 32 are joined together by MIG, TIG, seam welding, brazing, crimping, etc. A plurality of the joining lines 33a (first joining lines) are provided. The joining lines 33a (first joining lines) are provided around the plurality of passage beads 52 (and the passage beads 62). The joining line 33b (second joining line) is provided around the outer bead 53 (and the outer bead 63), and provided in the outer peripheral portion of the joint separator 33. A plurality of the joining lines 33c (third joining lines) are provided. The joining lines 33c are provided between the joining lines 33a and the joining line 33b.

As shown in FIG. 3, in a dual seal section where the passage bead 52 and the outer bead 53 extend next to each other, ridges 94 are formed integrally with the first metal separator 30 by press forming, between outer periphery of the passage beads 52 and the inner periphery of the outer bead 53. Each of the ridges 94 protrudes from the surface 30a of the first metal separator 30. A recess 95 is formed on the back surface 30b of the first metal separator 30, by the back side of the ridge 94 (see FIG. 5). The ridge 94 is provided between the joining line 33a around each of the gas passages (the oxygen-containing gas supply passage 34a, the oxygen-containing gas discharge passages 34b, the fuel gas supply passage 38a, and the fuel gas discharge passages 38b) and the inner periphery of the outer bead 53. Each of the joining lines 33c (33c1 to 33c6) is provided between the outer bead 53 and the ridge 94.

The two oxygen-containing gas discharge passages 34b and the two fuel gas discharge passages 38b are provided at four corner portions of the first metal separator 30 having the rectangular shape. The ridges 94 are provided at positions facing four corners 30k of the first metal separator 30 (corners on the marginal portion of the first metal separator 30). The joining line 33c is provided between the outside of the ridge 94 provided at the position facing the corner 30k and the inside of the outer bead 53.

Ridges 94a, 94c and the joining lines 33c1, 33c3 are provided between fluid passages at both ends among the five fluid passages provided at one end of the first metal separator 30 in the longitudinal direction (fuel gas discharge passages 38b) and the marginal portion (the long side and the short side) of the first metal separator 30. A ridge 94b and a joining line 33c2 are provided between a fluid passage at the center among the five fluid passages provided at one end of the first metal separator 30 in the longitudinal direction (oxygen-containing gas supply passage 34a) and the marginal portion (the short side) of the first metal separator 30.

Each of the ridges 94a, 94c and the joining lines 33c1, 33c3 extends along a part of the passage bead 52 around the fuel gas discharge passage 38b. The ridge 94b and the joining line 33c2 extend along a part of the passage bead 52 around the oxygen-containing gas supply passage 34a. The length of the ridges 94a, 94c and the joining lines 33c1, 33c3 by which the ridges 94a, 94c and the joining lines 33c1, 33c3 extend along the passage beads 52 around the fuel gas discharge passages 38b is larger than the length of the ridge 94b and the joining line 33c2 by which the ridge 94b and the joining line 33c2 extend along the passage bead 52 around the oxygen-containing gas supply passage 34a. It should be noted that the joining lines 33c1 to 33c3 may be provided to surround the passage bead 52 and the joining line 33a entirely.

Ridges 94d, 94f and the joining lines 33c4, 33c6 are provided between fluid passages at both ends among the five fluid passages provided at the other end of the first metal separator 30 in the longitudinal direction (oxygen-containing gas discharge passages 34b) and the marginal portion (the long side and the short side) of the first metal separator 30. A ridge 94e and the joining line 33c5 are provided between a fluid passage at the center among the five fluid passages provided at the other end of the first metal separator 30 in the longitudinal direction (fuel gas supply passage 38a) and the marginal portion (the short side) of the first metal separator 30.

Each of the ridges 94d, 94f and the joining lines 33c4, 33c6 extends along a part of the passage bead 52 around the oxygen-containing gas discharge passage 34b. The ridge 94e and the joining line 33c5 extend along a part of the passage bead 52 around the fuel gas supply passage 38a. The length of the ridges 94d, 94f and the joining lines 33c4, 33c6 by which the ridges 94d, 94f and the joining lines 33c4, 33c6 extend along the passage beads 52 around the oxygen-containing gas discharge passages 34b is larger than the length of the ridge 94e and the joining line 33c5 by which the ridge 94e and the joining line 33c5 extends along the passage bead 52 around the fuel gas supply passage 38a. It should be noted that the joining lines 33c4 to 33c6 may be provided to surround the passage bead 52 and the joining line 33a entirely.

As shown in FIG. 4, in a dual seal section where the passage bead 62 and the outer bead 63 extend next to each other, ridges 96 are formed integrally with the second metal separator 32 by press forming, between outer periphery of the passage beads 62 and the inner periphery of the outer bead 63. Each of the ridges 96 protrudes from the surface of the second metal separator 32. A recess 97 is formed on the back surface 32b of the second metal separator 32, by the back side of the ridge 96 (see FIG. 5). The ridge 96 is provided between the joining line 33a around each of the gas passages (the oxygen-containing gas supply passage 34a, the oxygen-containing gas discharge passage 34b, the fuel gas supply passage 38a, and the fuel gas discharge passage 38b) and the inner periphery of the outer bead 63. The joining line 33c is provided between the outer bead 63 and the ridge 96.

The two oxygen-containing gas discharge passages 34b and the two fuel gas discharge passages 38b are provided at four corner portions of the second metal separator 32 having the rectangular shape. The ridges 96 are provided at positions facing four corners 32k of the second metal separator 32 (corners on the marginal portion of the second metal separator 32). The joining line 33c is provided between the outside of the ridge 96 provided at the position facing the corner 32k and the inside of the outer bead 63.

Ridges 96a, 96c and the joining lines 33c4, 33c6 are provided between fluid passages at both ends among the five fluid passages provided at one end of the second metal separator 32 in the longitudinal direction (oxygen-containing gas discharge passages 34b) and the marginal portion (the long side and the short side) of the second metal separator 32. A ridge 96b and the joining line 33c5 are provided between a fluid passage at the center among the five fluid passages provided at one end of the second metal separator 32 in the longitudinal direction (fuel gas supply passage 38a) and the marginal portion (the short side) of the second metal separator 32.

Each of the ridges 96a, 96c and the joining lines 33c4, 33c6 extends along a part of the passage bead 62 around the oxygen-containing gas discharge passage 34b. The ridge 96b and the joining line 33c5 extend along a part of the passage bead 62 around the fuel gas supply passage 38a. The length of the ridges 96a, 96c and the joining lines 33c4, 33c6 by which the ridges 96a, 96c and the joining lines 33c4, 33c6 extend along the passage beads 62 around the oxygen-containing gas discharge passages 34b is larger than the length of the ridge 96b and the joining line 33c5 by which the ridge 96b and the joining line 33c5 extends along the passage bead 62 around the fuel gas supply passage 38a. It should be noted that the joining lines 33c4 to 33c6 may be provided to surround the passage bead 62 and the joining line 33a entirely.

Ridges 96d, 96f and the joining lines 33c1, 33c3 are provided between fluid passages at both ends among the five fluid passages provided at the other end of the second metal separator 32 in the longitudinal direction (fuel gas discharge passages 38b) and the marginal portion (the long side and the short side) of the second metal separator 32. A ridge 96e and the joining line 33c2 are provided between a fluid passage at the center among the five fluid passages provided at the other end of the second metal separator 32 in the longitudinal direction (oxygen-containing gas supply passage 34a) and the marginal portion (the short side) of the second metal separator 32.

Each of the ridges 96d, 96f and the joining lines 33c1, 33c3 extends along a part of the passage bead 62 around the fuel gas discharge passage 38b. The ridge 96e and the joining line 33c2 extend along a part of the passage bead 62 around the oxygen-containing gas supply passage 34a. The length of the ridges 96d, 96f and the joining lines 33c1, 33c3 by which the ridges 96d, 96f and the joining lines 33c1, 33c3 extend along the passage beads 62 around the fuel gas discharge passages 38b is larger than the length of the ridge 96e and the joining line 33c2 by which the ridge 96e and the joining line 33c2 extend along the passage bead 62 around the oxygen-containing gas supply passage 34a. It should be noted that the joining lines 33c1 to 33c3 may be provided to surround the passage bead 62 and the joining line 33a entirely.

As shown in FIG. 5, the height of the ridge 94 provided in the first metal separator 30 (protruding height of the ridge 94 from a base plate 30s as a reference plane) is smaller than the height of the bead seal 51 compressed by the tightening load in the stacking direction indicated by the arrow A (protruding height of the bead seal 51 from the base plate 30s). Therefore, a gap G is provided between the peak of the ridge 94 and the resin frame member 46. The height of the ridge 96 provided in the second metal separator 32 (protruding height from a base plate 32s as a reference plane) is smaller than the height of the bead seal 61 compressed by the tightening load in the stacking direction (protruding height of the bead seal 61 from the base plate 32s). Therefore, a gap G is provided between the peak of the ridge 96 and the resin frame member 46. The ridge 94 and the ridge 96 are overlapped with each other as viewed in the stacking direction. Thus, the recess 95 as the back surface of the ridge 94 and the recess 97 as the back surface of the ridge 96 face each other in the stacking direction.

A resin frame member 56 is fixed to each of the protruding front surfaces of the passage beads 52 and the outer bead 53 by printing or coating. A resin frame member 56 is fixed to each of the protruding front surfaces of the passage beads 62 and the outer bead 63 by printing or coating. It should be noted that the resin frame member 56 may be dispensed with.

Figure 6A:
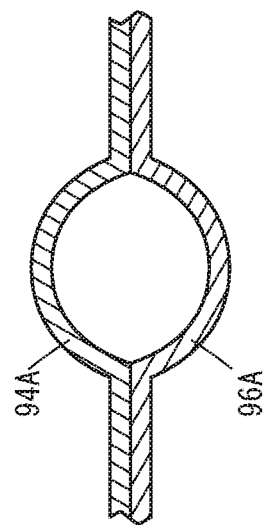
FIG. 6A is a cross sectional view showing a ridge according to another embodiment.
Figure 6B:
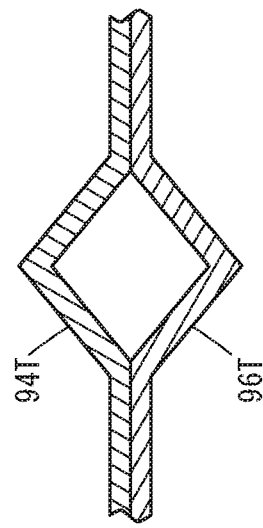
FIG. 6B is a cross sectional view showing a ridge according to still another embodiment.

Instead of the ridges 94, 96 having a trapezoidal shape in cross section, ridges 94T, 96T having a triangular shape in cross section as shown in FIG. 6A may be provided. Alternatively, ridges 94A, 96A having a circular shape in cross section as shown in FIG. 6B may be provided.

Operation of the fuel cell stack 10 having the above structure will be described below.

Firstly, as shown in FIG. 1, an oxygen-containing gas such as the air is supplied to the oxygen-containing gas supply passage 34a (inlet 35a) of the end plate 20a. A fuel gas such as a hydrogen-containing gas is supplied to the fuel gas supply passage 38a (inlet 39a) of the end plate 20a. A coolant water such as pure water ethylene glycol, or oil is supplied to the coolant supply passage 36a (inlet 37a) of the end plate 20a.

As shown in FIG. 3, the oxygen-containing gas flows from the oxygen-containing gas supply passage 34a into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 44 of the MEA 28a shown in FIG. 2.

In the meanwhile, as shown in FIG. 4, the fuel gas flows from the fuel gas supply passage 38a into the fuel gas flow field 58 of the second metal separator 32. The fuel gas moves along the fuel gas flow field 58 in the direction indicated by the arrow B, and the fuel gas is supplied to the anode 42 of the MEA 28a shown in FIG. 2.

Thus, in each MEA 28a, the oxygen-containing gas supplied to the cathode 44 and the fuel gas supplied to the anode 42 are partially consumed in electrochemical reactions in the second electrode catalyst layer and the first electrode catalyst layer to perform power generation.

Then, the oxygen-containing gas supplied to the cathode 44 is partially consumed at the cathode 44, and then, the oxygen-containing gas is discharged along the oxygen-containing gas discharge passages 34b in the direction indicated by the arrow A. Likewise, the fuel gas supplied to the anode 42 is partially consumed at the anode 42, and then, the anode is discharged along the fuel gas discharge passages 38b in the direction indicated by the arrow A.

Further, the coolant supplied to the coolant supply passage 36a flows into the coolant flow field 66 formed between the first metal separator 30 and the second metal separator 32, and then, the coolant flows in the direction indicated by the arrow B. After the coolant cools the MEA 28a, the coolant is discharged from the coolant discharge passage 36b.

In this case, the embodiment of the present invention offers the following advantages.

As shown in FIG. 5, in a dual seal section where the passage bead 52 and the outer bead 53 extend next to each other, ridges 94 are formed integrally with the first metal separator 30, between the passage beads 52 and the outer bead 53. Each of the ridges 94 protrudes from the surface 30a of the first metal separator 30. As described above, the ridge 94 provided between the passage bead 52 and the outer bead 53 absorbs movement of a root of the bead seal 51 (the passage bead 52 and the outer bead 53) to be displaced in a plane direction (direction perpendicular to the stacking direction). Therefore, at the time of applying the tightening load, generation of rotational moment of the bead seal 51 is suppressed. Likewise, the ridge 96 provided in the second metal separator 32 also suppress generation of the rotational moment of the bead seal 61. Further, by the joining lines 33c provided between the outer beads 53, 63 and the ridges 94, 96, it is possible eliminate or reduces the situations where the metal separators 30, 32 are spaced from each other between the outer beads 53, 63 and the ridges 94, 96, and suppress generation of the rotational moment more effectively. Therefore, it becomes possible to apply a uniform compression load (seal pressure) to the bead seals 51, 61 and obtain the desired sealing performance.

As in a metal separator 100 according to a comparative example shown in FIG. 7, in the case where no ridge is provided between a passage bead 102 and an outer bead 104, when the tightening load in the stacking direction is applied, since the root of a bead seal 101 (the passage bead 102 and the outer bead 104) is displaced in the plane direction, space for movement in the plane direction becomes no longer available. Therefore, rotational moment is generated in the bead seal 101. Further, also in the case where the ridges are provided to absorb displacement in the plane direction, as shown by virtual lines in FIG. 7, the two metal separators 100 that are joined together, may be separated from each other, in a portion 100a between the passage bead 102 and the outer bead 104. In this case, rotational moment is generated in the bead seal 101, and the root of the bead seal 101 is displaced in the stacking direction to tilt the bead seal 101. As a result, it becomes difficult to apply the uniform compression load (seal pressure) to the bead seal 101.

In contrast, as shown in FIG. 5, in the embodiment of the present invention, the ridge 94 is provided between the passage bead 52 and the outer bead 53 forming the dual seal section, and the ridge 96 is provided between the passage bead 62 and the outer bead 63 forming the dual seal section. Therefore, when the tightening load in the stacking direction is applied to the bead seals 51, 61, the ridges 94, 96 are extended in the stacking direction due to the load transmitted from the bead seals 51, 61 (the ridges 94, 96 are deformed toward the resin frame member 46). At this time, since the roots of the bead seals 51, 61 are displaced in the plane direction (toward the ridges 94, 96), generation of rotational moment of the bead seals 51, 61 is suppressed. Further, since the joining line 33c is provided between the outer beads 53, 63 and the ridges 94, 96, the metal separators 30, 32 are reliably joined together between the outer beads 53, 63 and the ridges 94, 96. Accordingly, since it is possible to reliably absorb the displacement in the plane direction by the ridges 94, 96, it is possible to suppress generation of the rotational moment more effectively. Therefore, it is possible to apply the uniform compression load (seal pressure) to the bead seals 51, 61.

The present invention is not limited to the above described embodiment. Various modifications may be made without departing from the gist of the present invention.

The above embodiment is summarized as follows:

The embodiment of the present invention discloses the fuel cell joint separator (33). The fuel cell joint separator (33) is formed by joining the two metal separators (30, 32) together, the reactant gas flow field (48, 58) being formed on one surface as a reaction surface of each of the two metal separators (30, 32), the reactant gas flow field (48, 58) being configured to allow a fuel gas or an oxygen-containing gas as a reactant gas to flow through the reactant gas flow field (48, 58), the fluid passage connected to the reactant gas flow field (48, 58) or the coolant flow field (66) penetrating through the fuel cell joint separator (33) in a separator thickness direction, the bead seal (51, 61) protruding from the one surface of the metal separator (30, 32), the bead seal (51, 61) being configured to prevent leakage of the reactant gas or a coolant as fluid, the bead seal (51, 61) including the passage bead (52, 62) provided around the fluid passage and the outer bead (53, 63) provided around the reactant gas flow field (48, 58), the fuel cell joint separator (33) being stacked on the membrane electrode assembly (28a), a tightening load in a stacking direction being applied to the fuel cell joint separator (33), wherein in a dual seal section where the passage bead (52, 62) and the outer bead (53, 63) extend next to each other, the ridge (94, 96) protruding from the one surface is formed integrally with the metal separator (30, 32), between the passage bead (52, 62) and the outer bead (53, 63), the height of the ridge (94, 96) is smaller than the height of the bead seal (51, 61) compressed by the tightening load, and the joining line (33c) configured to join the two metal separators (30, 32) together, is provided between the outer bead (53, 63) and the ridge (94, 96).

The fluid passage may be disposed at a corner portion of the fuel cell joint separator (33) having a rectangular shape, and the joining line (33c) may be provided between the outside of the ridge (94, 96) provided at a position facing a corner of the fuel cell joint separator (33) and the inside of the outer bead (53, 63).

The ridge (94, 96) and the joining line (33c) extend along at least a part of the passage bead (52, 62) provided around the fluid passage as a passage of the reactant gas.

The fluid passage includes five fluid passages provided at one end of the fuel cell joint separator (33) and arranged in a width direction of the reactant gas flow field (48, 58), and the ridge (94, 96) and the joining line (33c) may be provided at each of positions between fluid passages at both ends among the five fluid passages and a marginal portion of the fuel cell joint separator (33), and at a position between a fluid passage at the center among the five fluid passages and the marginal portion of the fuel cell joint separator (33).

The fluid passage may include five fluid passages provided at one end of the fuel cell joint separator (33) and arranged in a width direction of the reactant gas flow field (48, 58), the ridge (94, 96) may comprise a plurality of the ridges, the joining line (33c) may comprise a plurality of the joining lines, the length of each of the ridges (94, 96) and each of the joining lines (33c) by which the ridges (94, 96) and the joining lines (33c) extend between the fluid passages at both ends among the five fluid passages and the marginal portion of the fuel cell joint separator (33) may be larger than the length of the ridge (94, 96) and the joining line (33c) by which the ridge (94, 96) and the joining line (33c) extend between the fluid passage at the center among the five fluid passages and the marginal portion of the fuel cell joint separator (33).

Another joining line (33a) configured to join the two metal separators (30, 32) may be provided between the passage bead (52, 62) and the ridge (94, 96).

Further, the above embodiment discloses the fuel cell joint separator (33) formed by joining two metal separators (30, 32) together. The reactant gas flow field (48, 58) is formed on one surface as a reaction surface of each of the two metal separators (30, 32), the reactant gas flow field (48, 58) being configured to allow a fuel gas or an oxygen-containing gas as a reactant gas to flow through the reactant gas flow field (48, 58), the fluid passage connected to the reactant gas flow field (48, 58) or a coolant flow field (66) penetrating through the fuel cell joint separator (33) in a separator thickness direction, the bead seal (51, 61) protruding from the one surface of the metal separator, the bead seal (51, 61) being configured to prevent leakage of the reactant gas or a coolant as fluid, the bead seal (51, 61) including the passage bead (52, 62) provided around the fluid passage and the outer bead (53, 63) provided around the reactant gas flow field (48, 58), the fuel cell joint separator (33) being stacked on the membrane electrode assembly (28a), a tightening load in a stacking direction being applied to the fuel cell joint separator (33), wherein the plurality of joining lines (33a, 33c) configured to join the two metal separators (30, 32) together, are provided in parallel between the passage bead (52, 62) and the outer bead (53, 63).

Further, the above embodiment discloses the fuel cell (12) including the membrane electrode assembly (28a), and the fuel cell joint separator (33) stacked on the membrane electrode assembly (28a). The fuel cell joint separator (33) is formed by joining the two metal separators (30, 32) together, the reactant gas flow field (48, 58) is formed on one surface as a reaction surface of each of the two metal separators (30, 32), the reactant gas flow field (48, 58) being configured to allow a fuel gas or an oxygen-containing gas as a reactant gas to flow through the reactant gas flow field (48, 58), the fluid passage connected to the reactant gas flow field (48, 58) or a coolant flow field penetrates through the fuel cell joint separator (33) in a separator thickness direction, the bead seal (51, 61) protrudes from the one surface of the metal separator, the bead seal (51, 61) being configured to prevent leakage of the reactant gas or a coolant as fluid, the bead seal (51, 61) includes a passage bead (52, 62) provided around the fluid passage and an outer bead (53, 63) provided around the reactant gas flow field (48, 58), and the fuel cell joint separator (33) is stacked on the membrane electrode assembly (28a), a tightening load in a stacking direction being applied to the fuel cell joint separator (33), wherein in a dual seal section where the passage bead (52, 62) and the outer bead (53, 63) extend next to each other, the ridge (94, 96) protruding from the one surface is formed integrally with the metal separator (30, 32), between the passage bead (52, 62) and the outer bead (53, 63), the height of the ridge (94, 96) is smaller than the height of the bead seal (51, 61) compressed by the tightening load, and the joining line (33c) configured to join the two metal separators (30, 32) together, is provided between the outer bead (53, 63) and the ridge (94, 96).

What is claimed is:

1. A fuel cell joint separator formed by joining two metal separators together, a reactant gas flow field being formed on one surface as a reaction surface of each of the two metal separators, the reactant gas flow field being configured to allow a fuel gas or an oxygen-containing gas as a reactant gas to flow through the reactant gas flow field, a fluid passage connected to the reactant gas flow field or a coolant flow field penetrating through the fuel cell joint separator in a separator thickness direction, a bead seal protruding from the one surface of the metal separator, the bead seal being configured to prevent leakage of the reactant gas or a coolant as fluid, the bead seal comprising a passage bead provided around the fluid passage and an outer bead provided around the reactant gas flow field, the fuel cell joint separator being stacked on a membrane electrode assembly, a tightening load in a stacking direction being applied to the fuel cell joint separator, wherein in a dual seal section where the passage bead and the outer bead extend next to each other, a ridge protruding from the one surface is formed integrally with the metal separator, between the passage bead and the outer bead, a height of the ridge is smaller than a height of the bead seal compressed by the tightening load, and a joining line configured to join the two metal separators together, is provided between the outer bead and the ridge.

2. The fuel cell joint separator according to claim 1, wherein the fluid passage is disposed at a corner portion of the fuel cell joint separator having a rectangular shape, and the joining line is provided between outside of the ridge provided at a position facing a corner of the fuel cell joint separator and inside of the outer bead.

3. The fuel cell joint separator according to claim 1, wherein the ridge and the joining line extend along at least a part of the passage bead provided around the fluid passage as a passage of the reactant gas.

4. The fuel cell metal separator according to claim 1, wherein the fluid passage comprises five fluid passages provided at one end of the fuel cell joint separator and arranged in a width direction of the reactant gas flow field, and the ridge and the joining line are provided at each of positions between fluid passages at both ends among the five fluid passages and a marginal portion of the fuel cell joint separator, and at a position between a fluid passage at a center among the five fluid passages and the marginal portion of the fuel cell joint separator.

5. The fuel cell joint separator according to claim 1, wherein the fluid passage comprises five fluid passages provided at one end of the fuel cell joint separator and arranged in a width direction of the reactant gas flow field, the ridge comprises a plurality of the ridges, the joining line comprises a plurality of the joining lines, a length of each of the ridges and each of the joining lines by which the ridges and the joining lines extend between the fluid passages at both ends among the five fluid passages and the marginal portion of the fuel cell joint separator is larger than a length of the ridge and the joining line by which the ridge and the joining line extend between the fluid passage at a center among the five fluid passages and the marginal portion of the fuel cell joint separator.

6. The fuel cell joint separator according to claim 1, wherein another joining line configured to join the two metal separators is provided between the passage bead and the ridge.

7. A fuel cell comprising:

a membrane electrode assembly; and a fuel cell joint separator stacked on the membrane electrode assembly, wherein the fuel cell joint separator is formed by joining two metal separators together, a reactant gas flow field is formed on one surface as a reaction surface of each of the two metal separators, the reactant gas flow field being configured to allow a fuel gas or an oxygen-containing gas as a reactant gas to flow through the reactant gas flow field, a fluid passage connected to the reactant gas flow field or a coolant flow field penetrates through the fuel cell joint separator in a separator thickness direction, a bead seal protrudes from the one surface of the metal separator, the bead seal being configured to prevent leakage of the reactant gas or a coolant as fluid, the bead seal comprises a passage bead provided around the fluid passage and an outer bead provided around the reactant gas flow field, and the fuel cell joint separator is stacked on the membrane electrode assembly, a tightening load in a stacking direction being applied to the fuel cell joint separator, and wherein in a dual seal section where the passage bead and the outer bead extend next to each other, a ridge protruding from the one surface is formed integrally with the metal separator, between the passage bead and the outer bead, a height of the ridge is smaller than a height of the bead seal compressed by the tightening load, and a joining line configured to join the two metal separators together, is provided between the outer bead and the ridge.

* * * * *